US007009562B2

(12) United States Patent
Jenabi

(10) Patent No.: US 7,009,562 B2
(45) Date of Patent: Mar. 7, 2006

(54) SINGLE KU-BAND MULTI-POLARIZATION GALLIUM ARSENIDE TRANSMIT CHIP

(75) Inventor: Masud Jenabi, Los Angeles, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/739,290

(22) Filed: Dec. 19, 2003

(65) Prior Publication Data

US 2004/0130490 A1 Jul. 8, 2004

Related U.S. Application Data

(62) Division of application No. 10/014,553, filed on Dec. 14, 2001.

(51) Int. Cl.
*H01Q 1/38* (2006.01)
*G01S 13/00* (2006.01)

(52) U.S. Cl. .............................. 343/700 MS; 342/157; 342/158; 342/175; 342/188

(58) Field of Classification Search ......... 343/700 MS; 342/157, 158, 175, 188
See application file for complete search history.

(56) References Cited

U.S. PATENT DOCUMENTS 4,088,970 A * 5/1978 Fassett et al. ............... 333/150
5,030,961 A * 7/1991 Tsao .................... 343/700 MS
5,659,322 A * 8/1997 Caille .......................... 342/188
5,933,108 A * 8/1999 Mohuchy ..................... 342/175
6,828,932 B1 * 12/2004 Jenabi ......................... 342/188

OTHER PUBLICATIONS

S.A. Raby et al.; "Ku-Band Transmit Phased Array Antenna for use in FSS Communication Systems"; IEEE-MTS-S (2000).*
"Ku-Band Transmit Phased Array Antenna for use in FSS Communication Systems," by S.A. Raby et al., IEEE-MTS-S (2000). (4 pages).
"Communications Systems Group Wins Key DSCS Program," by Anonymous, ITT Industries System Divison News, Sep. 2000. (See p. 3 out of pp. 1-12).

* cited by examiner

*Primary Examiner*—Wilson Lee
*Assistant Examiner*—Leith A. Al-Nazer
(74) *Attorney, Agent, or Firm*—Hunton & Williams LLP

(57) ABSTRACT

The present invention is a wide band GaAs microwave monolithic integrated circuit (MMIC) transmit chip that is capable of transmitting linearly or circularly polarized signals when connected to a pair of orthogonal cross-polarized antennas. In an active phased-array antenna environment, this transmit chip is capable of transmitting signals with different scan angles. This invention also contains a digital serial to parallel converter that uses TTL signal to control the phase shifter and attenuator circuits that are required for controlling the polarization and scan angle of the transmitted signal.

10 Claims, 5 Drawing Sheets

SINGLE KU-BAND MULTI-POLARIZATION GALLIUM ARSENIDE TRANSMIT CHIP

RELATED APPLICATIONS

This application is a divisional of pending U.S. application Ser. No. 10/014,553 filed on 14 Dec. 2001.

FIELD OF THE INVENTION

The present invention generally relates to a multi-polarization active array transmit antenna.

BACKGROUND OF THE INVENTION

Array transmit antenna technology is widely used in the area of satellite telecommunication, data transmission, radar systems and voice communication systems. Array antennas use electronic scanning technologies, such as time delay scanning, frequency scanning, or phase scanning to steer the transmitted beam. Use of electronic scanning allows an antenna system to achieve increased transmission data rates, instantaneous beam positioning, and the ability to operate in a multi-target mode. By using electronic scanning technology, an array transmit antenna can perform multiple functions that are otherwise performed by several separate antenna systems. Of the several electronic scanning technologies, phase scanning is the one used most widely in array antennas. Phase scanning is based on the principle that electro-magnetic energy received at a point in space from two or more closely-spaced radiating elements is at a maximum when the energy from each radiating element arrives at that point in phase. An array transmit antenna using the phase scanning technique is known as a "phased array antenna".

In the application of phased array antennas in the area of defense electronics, such antennas are often used in electronic warfare (EW) systems for generating electronic counter-measures (ECM). An example of the application of a phased array antenna in the field of commercial telecommunications is for low-earth-orbit satellites that use phased array antennas to transmit multiple signal beams, with each beam capable of carrying as much as 1 gigabit of data per second. In both military and commercial applications of phased array antennas, it is important that such antennas are small in size and weight so that they can be easily mounted on satellites, airborne vehicles, etc.

An example of a transmit phased array antenna is discussed by S. A. Raby, et al., in the article entitled "Ku-Band Transmit Phased Array Antenna for use in FSS Communication system," IEEE-MTT-S (2000). The antenna described by the Raby article uses Gallium Arsenide (GaAs) chips that operate in the 14 to 14.5 GHz range. The driver chip of the antenna described by the Raby article contains two 4-bit phase shifters and microwave monolithic integrated circuit (MMIC) amplifier stages that consist of amplifiers and quadrature couplers. An external silicon serial-to-parallel converter is used to control the phase shifters attached to the antenna. The transmit phase array antenna described in the Raby article is capable of transmitting only one linearly polarized signal. In practice it is highly desirable to have a transmit phase array antenna that is capable of transmitting multiple signals to attain higher data transmission rates. Also, it is desirable that a transmit phased array antenna be capable of transmitting left and right hand circularly-polarized signals in addition to transmitting linearly polarized signals. These are significant disadvantages.

Another example of a transmit phased array antenna is the Transmit Tile™ that was designed by ITT Gilfillan. A Transmit Tile™ has two operating frequencies and it is capable of transmitting linearly or circularly polarized signals with varying scan angles. The Transmit Tile™ uses an additional GaAs chip and an additional Low Temperature Co-fired Ceramic (LTCC) substrate to accomplish these tasks. As a result, the structure of a Transmit Tile™ comprises of five layers of LTCC substrates that are stacked one on top of the other. These substrates are connected vertically using "fuzz-bottom" interconnects and caged via hole technology. A Transmit Tile™ comprises of two linear polarization/scan chips and one circular polarization scan chip.

The structure of a Transmit Tile™ containing five substrates makes it an undesirably thick array. It is preferable to have a transmit array antenna that is as thin as possible in order to reduce aerodynamic drag. Also, it is desirable to have a transmit array antenna that has a lower total power consumption than the power consumption exhibited by the Transmit Tile™. A Transmit Tile™ also displays a higher level of spurious noise due to signal leakage and coupling between channels of the circular polarization chip that carry the two operating signals. Also, a Transmit Tile™ operates with two operating signals and can not be converted to a transmitter with single operating signal. In practice it is desirable that a transmit array antenna function even with a single operating signal. These are significant disadvantages.

Other problems and drawbacks also exist.

SUMMARY OF THE INVENTION

An embodiment of the present invention comprises a transmitter chip designed using low cost MMIC architecture, wherein the transmitter chip comprises phase shifters to generate linearly polarized RF signal and phase shifters to generate circularly polarized RF signal.

According to one aspect of the invention, the transmitter chip uses a high speed GaAs digital serial-to-parallel converter (SPC) for controlling phase shifter and attenuator circuits.

According to yet another aspect of the present invention, the transmitter chip uses digital transistor-transistor logic (TTL) to control the polarization and scan angles.

According to another aspect of the invention, the transmitter chip is used in a transmit phased array antenna, wherein the transmit phased array antenna consists of four LTCC substrates.

According to another aspect of the invention, the transmitter chip, when connected to a pair of orthogonal radiators, is capable of transmitting linearly and circularly polarized signals with variable scan angles in a frequency range of about 14 to 15.5 Ghz.

According to another aspect of the invention, the transmitter chip can generate a signal with a polarization angle in the range of about 0 to 90 degrees.

According to yet another aspect of the invention, the transmitter chip can also generate left-hand and right-hand circularly-polarized signals.

According to another aspect of the invention, the transmitter chip can generate a signal with a scan angle in the range of about −45 to 45 degrees.

According to another aspect of the invention, the transmitter chip produces a signal with low spurious noise.

According to yet another aspect of the present invention, the transmitter chip can be converted to a transmitter with a single operating signal.

According to another aspect of the present invention, the transmitter chip can be used to create a thinner transmit phased array antenna.

According to yet another aspect of the present invention, the transmitter chip can be used to create a low cost transmit phased array antenna.

According to another aspect of the invention, the transmit chip can transmit left-hand or right-hand circularly polarized signals with very low axial ratios.

According to yet another aspect of the present invention, the transmit chip uses Multifunctional Self-Aligned Gate Process (MSAG).

According to another aspect of the present invention, the transmit chip provides higher RF yields.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the systems and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

To facilitate understanding, identical reference numerals have been used to denote identical elements common to the figures.

DETAILED DESCRIPTION OF THE INVENTION

Figure 1:
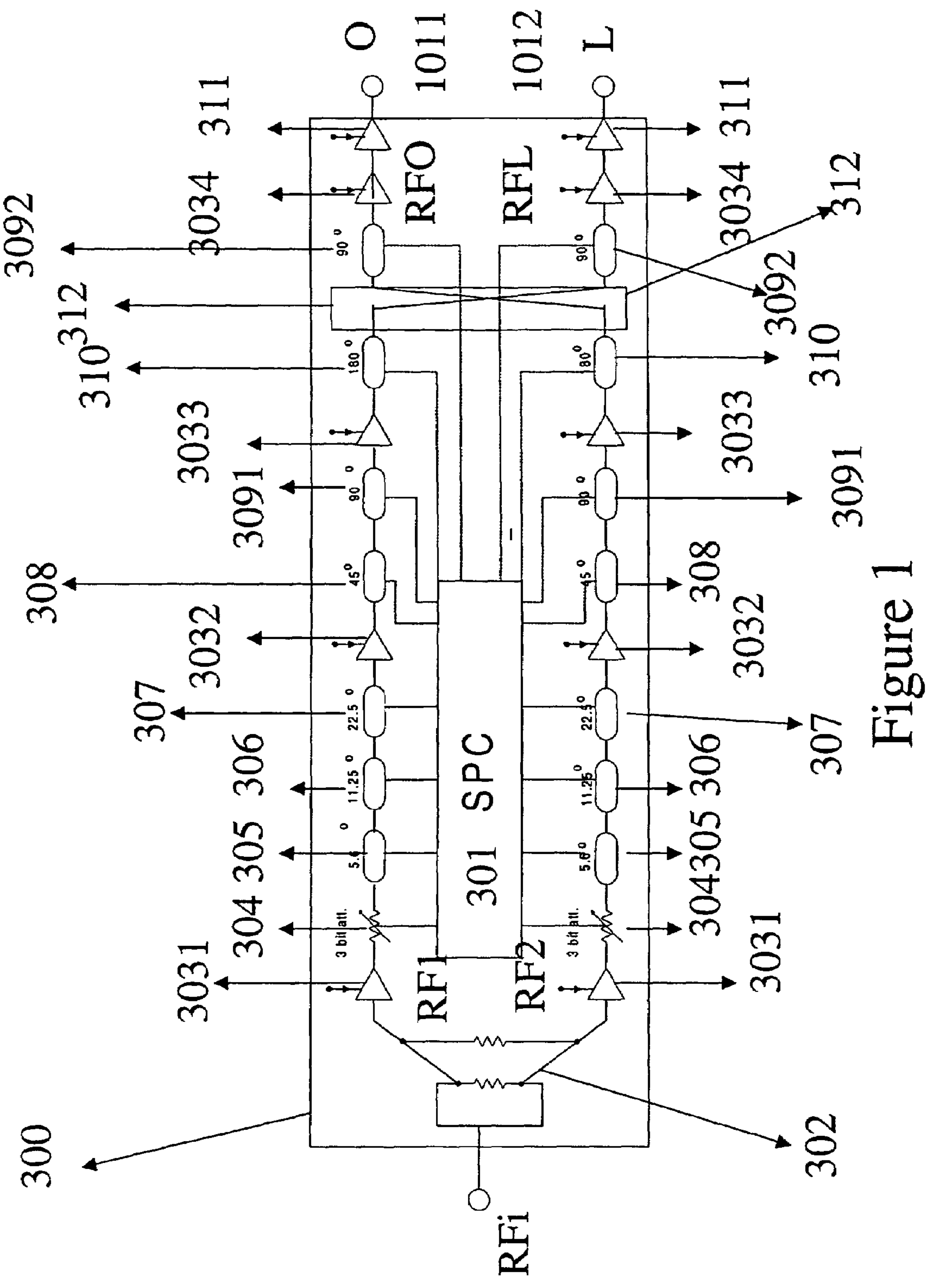
FIG. 1 is a functional block diagram of a transmit chip according to an embodiment of the present invention.

FIG. 1 is a functional block diagram of a transmitter chip 300 according to an embodiment of the present invention. According to this embodiment, the input signal RFi is connected to a two-stage divider 302. The outputs RF1 and RF2 from the divider 302 are input into two single-stage amplifiers 3031. The output signals from each single stage amplifier 3031 is input into a 3-bit attenuator 304. The output from each of the 3-bit attenuators 304 is input into a 5.625° phase shifter 305. The output from each of the 5.625° phase shifters 305 is input into a 11.25° phase shifters 306. The output from each of the 11.25° phase shifters 306 is input into a 22.5° phase shifter 307. The output from each of the 22.5° phase shifter 307 is input into a single-stage amplifier 3032. The output from each of the single-stage amplifiers 3032 is input into a 45° phase shifter 308. The output from each of the 45° phase shifter 308 is input into a 90° phase shifters 3091. The output from each of the 90° phase shifter 3091 is input into a single-stage amplifier 3033. The output from each of the single stage amplifiers 3033 is input into a 180° phase shifter 310. The output signal from both 180° phase shifters 310 is input into a Lange coupler 312. Each of the two outputs of the Lange coupler 312 is connected to a 90° phase shifter 3092. The outputs from each of the 90° phase shifters 3092 are connected to single-stage amplifiers 3034. The output from each of the single stage amplifiers 3034 is input into power amplifiers 311. The outputs from power amplifiers 311 are connected to the orthogonal radiator/balun assembly 1011 and the linear radiator/balun assembly 1012. The output signals of serial-to-parallel converter (SPC) 301 are input as control signals into each of the phase shifters and the attenuators. The SPC 301 receives three digital input signals of data, load and clock from an interconnect substrate as further described in FIG. 2.

The configuration and operation of transmitter chip 300 of FIG. 1 is now further described. The input signal RFi is a radio frequency (RF) signal. According to an embodiment of the present invention, RFi is a Ku-band (e.g., 10,700 MHz to 14,300 MHz) RF signal. The divider 302 divides the input signal RFi into two in-phase signals RF1 and RF2. A divider 302 used as an RF signal splitter can be designed according to a variety of architectures, including a miniaturized distributed lump architecture, a micro-strip architecture, etc. In an embodiment of the present invention, divider 302 is designed in the configuration of a Wilkinson divider using a strip-line formed on an MMIC. The design and implementation of such a Wilkinson divider is well known to those of ordinary skill in the art. The output signals RF1 and RF2 from Wilkinson divider 302 are amplified by single-stage amplifiers 3031. Single-stage amplifiers can be implemented using a variety of designs, such as a simple wideband RF amplifier design, Darlington cascade circuit design, generic microwave integrated circuit design, etc. In an embodiment of the present invention, the single-stage amplifier 3031 is designed using a generic microwave integrated circuit design. Implementation of a single stage amplifier using a generic microwave integrated circuit design is well within the skills of the ordinary artisan. The amplified outputs from the single-stage amplifiers 3031 are attenuated by the 3-bit attenuators 304. Attenuators 304 are used to swamp-out impedance variations to attain the desired impedance matching. The attenuators 304 are controlled by a control signal output from the SPC 301. In an embodiment of the present invention, attenuators 304 are designed using a MMIC strip-line architecture. The output from each of the attenuators 304 are passed through a series of phase shifters 305, 306 and 307. Each of these phase shifters is controlled by a control signal output from the SPC 301. Phase shifters 305, 306 and 307 can be designed in an MMIC using a number of design techniques including switched-delay line phase shifters, reflection-type phase shifters, I-Q vector modulators, switched-filter phase shifters, etc. According to an embodiment of the present invention, phase shifters 305,

306 and 307 are designed using switched-filter phase shifter design. A phase shifter designed using a switched-filter design uses a low-pass and a high-pass filter lag. The desired phase shifting is achieved by switching between these two filter lags. As depicted in the exemplary embodiment of FIG. 1, phase shifters 305 are designed to effect a phase shift of 5.625°, phase shifters 306 are designed to effect a phase shift of 11.25°, and phase shifters 307 are designed to effect a phase shift of 22.5°. Phase shifters 305, 306 and 307 shift the phase of the signals RF1 and RF2 depending on the control signal received from SPC 301. The single-stage amplifiers 3032 receive signal outputs from phase shifters 307 and amplify them before they are input into the next series of phase shifters 308 and 3091. The design of phase shifters 308 and 3091 is similar to the design of phase shifters 304, 305 and 307, except that phase shifters 308 are designed to effect a phase shift of 45° and phase shifters 3091 are designed to effect a phase shift of 90°. Phase shifters 308 and 3091 shift the phase of the signals RF1 and RF2 depending on the control signal received from the SPC 301. The phase-shifted signals output from the phase shifters 3091 are amplified by single stage amplifiers 3033. The design of single-stage amplifiers 3033 is similar to that of single-stage amplifiers 3031 and 3032. The amplified output signal from the single stage amplifier 3033 is phase-shifted by the 180° phase shifters 310. The phase shift effected by the 180° phase shifters 310 is controlled by the signal from the SPC 301. The phase-shifted outputs RF1 and RF2 from the phase shifters 310 are connected to the input of the Lange coupler 312. Lange coupler 312 couples the output signals RF1 and RF2 to the next stage of 90° phase shifters 3092. Lange couplers typically derive coupling from closely-spaced transmission lines, such as micro-strip lines. In an embodiment of the present invention, MMIC micro-strip lines are used in the design of Lange coupler 312. The design and implementation of a Lange coupler is well within the skill of an ordinary artisan.

The output signals from the Lange coupler 312 are phase shifted by 90° phase shifters 3092. Phase shifters 3092 output either left-hand or right-hand circularly-polarized signals. The phase shift effected by the 90° phase shifters 3092 is controlled by a signal from the SPC 301. The design and implementation of the 90° phase shifters 3092 are similar to the design and implementation of the 90° phase shifters 3091. The outputs RFL and RFO of the 90° phase shifters 3092 are amplified by the single-stage amplifiers 3034 and 311. The amplified output signals RFO and RFL from the amplifier 311 are connected to the radiator/balun assembly on the radiator/balun substrate.

A transmitter designed in accordance with the exemplary transmitter chip 300 of FIG. 1 has several beneficial advantages. The combination of amplifiers 3031, 3032 and 3033, attenuators 304, phase shifters 305, 306, 307, 308, 3091 and 310, and the Lange coupler 312 converts the input signal RFi to linearly polarized signals RFO and RFL. The scan angle and the linear polarization angle of the RFO and RFL output signals from the Lange coupler 312 are determined by the various control signals generated by the SPC 301, which are used to control the phase shifters and attenuators listed above. The conventional design does not incorporate the Lange coupler 312 as part of the linear polarization and scan chip. In an embodiment of the present invention, a micro-strip type of Lange coupler 312 is included on the linear polarization and scan chip. In addition to the incorporation of the Lange coupler 312, an embodiment of the present invention described in FIG. 1 also includes the phase shifters 3092 to provide a left-hand and a right-hand circularly-polarized signals. The incorporation of the Lange coupler 312 and the phase shifters 3092 used to provide a left-hand and a right-hand circularly-polarized signals on the same chip allows the implementation of a phased array antenna using only four substrates. Incorporation of Lange coupler 312 on the chip results in each of the substrates carrying the linear polarization and allows the scan chip to be thinner than the conventional design. Also, the incorporation of the phase shifters 3092 on the same chip to provide a left-hand and a right-hand circularly-polarized signals allows for a design of a phased array antenna that can provide both linear and circular polarization using only four substrates. The conventional design of such a phased array antenna required five substrates to provide linear and orthogonal polarization.

Figure 2:
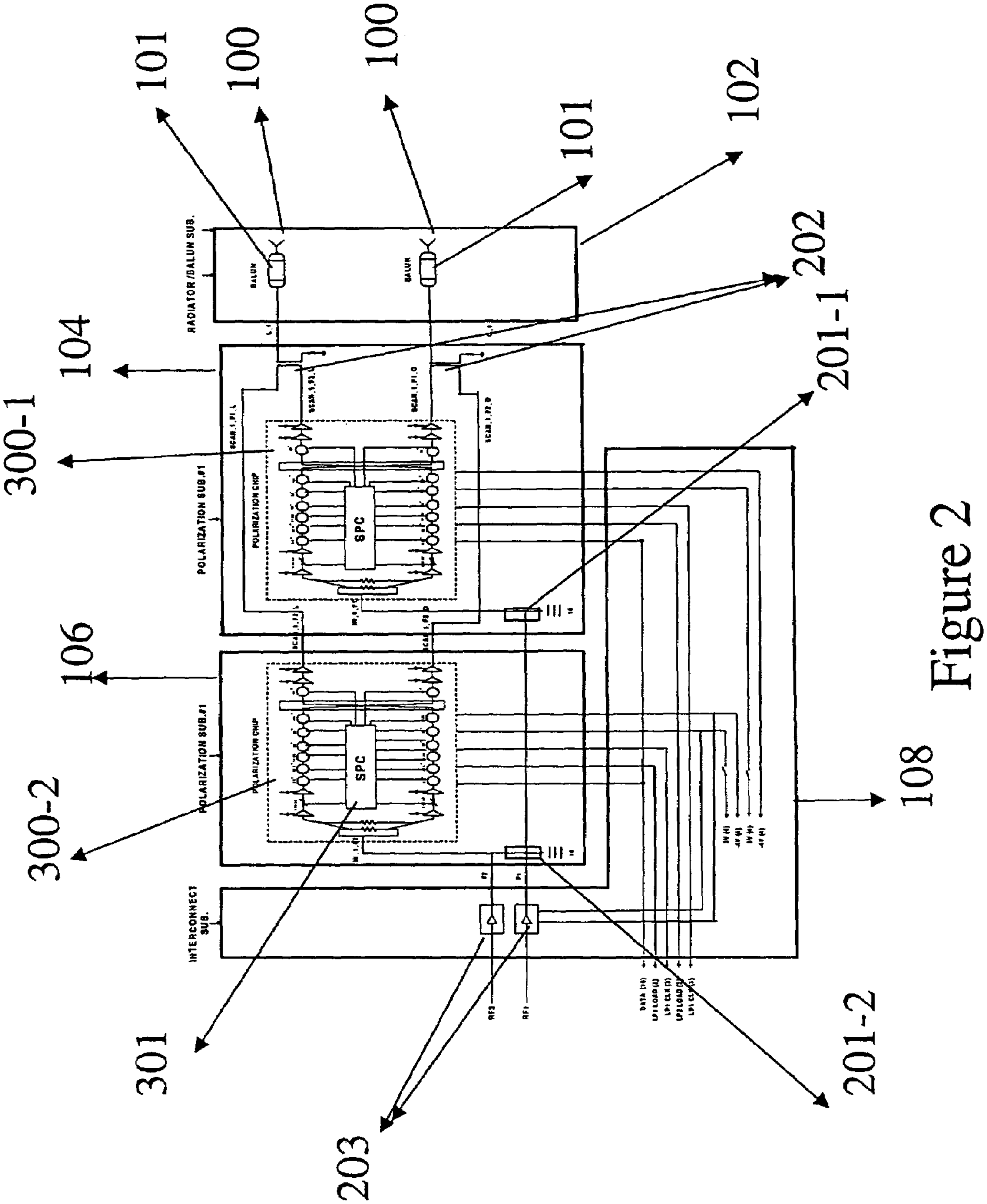
FIG. 2 is a functional block diagram of a transmit phased array antenna with two operating frequencies according to an embodiment of the present invention.

FIG. 2 is a functional block diagram of a transmit phased array antenna with two operating frequencies according to an embodiment of the present invention. In an embodiment of the present invention, the phased array antenna comprises four substrates. The radiator/balun substrate 102 is a multi-layer substrate. The radiator/balun substrate 102 is mounted on the first polarization substrate 104, which is mounted on the second polarization substrate 106. The second linear polarization substrate 106 is mounted on the interconnect substrate 108.

According to an embodiment, the radiator/balun substrate 102 contains sixteen baluns 101 that receive input signals from the first polarization substrate 104. The baluns 101 are two-way dividers that divide an input signal into two equal signals that are 180° out of phase. The outputs of the baluns 101 are input into the planar square patch radiators 100 that are mounted on the top of the substrate 102. In an embodiment of the present invention, the radiator/balun substrate 102 contains sixteen square patch radiators 100. For simplicity, only one square patch radiator 100 is shown in FIG. 2. The square patch radiators 100 radiate linearly-polarized and circularly-polarized RF energy. The details of mounting square patch radiators 100 and linking them to the baluns 101 is well within the skill of the ordinary artisan. Radiator/balun substrate 102 can be built using a number of technologies such as PC Board, LTCC, etc. In an embodiment of the present invention the radiator/balun substrate 102 is constructed using LTCC technology to minimize the RF signal loss. The design of a radiator/balun substrate 102 using LTCC technology is well known to those of ordinary skill in the art.

The first polarization substrate 104 contains sixteen transmitter chips 300-1, the design of each of which may be implemented as described in FIG. 1. For simplicity, only one transmitter chip 300-1 is shown in FIG. 2. Polarization substrate 104 is made of a multi-layer LTCC substrate. The output of the transmitter chip 300-1 on the polarization substrate 104 is combined with the output of the transmitter chip 300-2 located on the second polarization substrate 106 using a two-way combiner 202. The two-way combiner 202 can be designed using a coupled transmission line design, or other designs well known to those of ordinary skill in the art. The combined output of the two-way combiner 202 is coupled to the balun 101 located on the radiator-balun substrate 102. The transmitter chip 300-1 receives its input from a sixteen way divider 201-1. The sixteen-way divider 200-1 receives RF signal RF1 from the interconnect substrate 108.

The transmit chip 300-1 is connected to the sixteen-way divider 201-1 and the two-way combiner 202 using "caged via holes" and strip lines as described below in FIG. 3. In an embodiment of the present invention, the sixteen-way divider 201-1 is designed on the polarization substrate using MMIC technology. The design and implementation of a sixteen-way divider is well known to those of ordinary skill in the art. The transmit chip 300-1 also receives a DC input signal, clock signal and load signal from the interconnect substrate 108. The transmitter chip 300-1 located on the first polarization substrate 104 controls the polarization and the scan angle of the RF signal fed to the balun 101 based on the data signal received by the transmitter chip 300-1. The transmitter chip 300-1 also provides amplification to the RF signal input into it.

The second polarization substrate 106 also contains sixteen transmitter chips 300-2, the design of each of which may be in accordance with the transmitter chip described in FIG. 1. For simplicity, only one transmitter chip 300-2 is shown in FIG. 2. Polarization substrate 106 is made of a multi-layer LTCC substrate. The output of the transmitter chip 300-2 on the polarization substrate 106 is combined with the output of the transmitter chip 300-1 located on the first polarization substrate 104 using a two-way combiner 202. The combined output of the two-way combiner 202 is coupled to the balun 101 located on the radiator-balun substrate 102. The transmitter chip 300-2 receives inputs from a sixteen way divider 201-2. The sixteen-way divider 201-2 receives RF signal RF2 from the interconnect substrate 108. The transmit chip 300-2 is connected to the sixteen-way divider 201-2 and the two-way combiner 202 using "caged via holes" and strip lines as described below in FIG. 3.

In an embodiment of the present invention, the sixteen-way divider 201-2 is designed on the polarization substrate using MMIC technology. The design and implementation of a sixteen-way divider is well known to those of ordinary skill in the art. The transmit chip 300-2 also receives a DC input signal, clock signal and load signal from the interconnect substrate 108. The transmitter chip 300-2 located on the second polarization substrate 106 controls the polarization and scan angle of RF signals fed to the balun 101 based on the data signal received by the transmitter chip 300-2. The transmitter chip 300-2 also provides amplification to the RF signal inputted into it.

The interconnect substrate 108 is located below the second polarization substrate 106. In an embodiment of the present invention, the interconnect substrate 108 is a multi-layer LTCC substrate. In an embodiment of the present invention, the interconnect substrate 108 contains two driver chips 203 that also provide amplification to the input signals. According to one approach, the interconnect substrate 108 has a multi-pin connector for delivering DC and digital signals, and has two Gilbert Push-On (GPO) connectors for bringing RF signals to the second polarization substrate 106. In an embodiment of the present invention, the interconnect substrate 108 also contains capacitors that are used for filtering of DC and digital signals.

As described in FIG. 2, a transmit phased array antenna with two operating frequencies can be designed using the transmit chip 300 with only four substrates. The combination of linear-polarization controlling phase shifters and circular-polarization controlling phase shifters in a single transmit chip allows this design with lower number of substrates than the traditional design of a Transmit Tile™.

Figure 3:
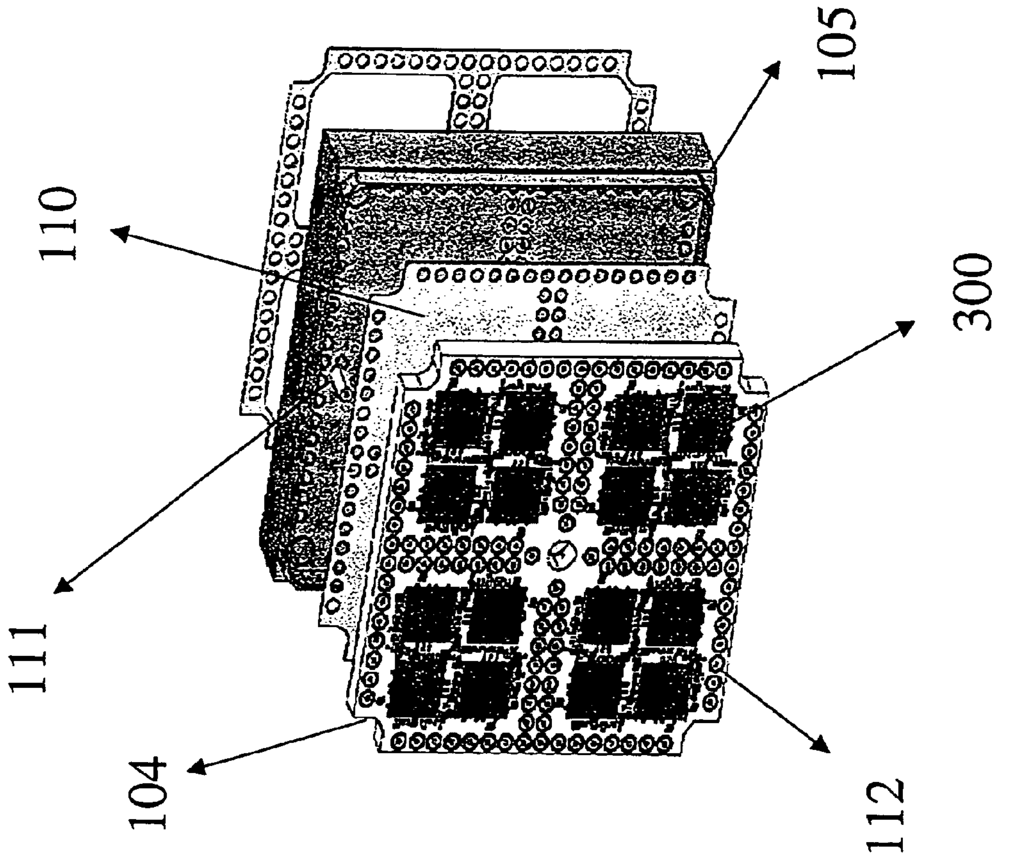
FIG. 3 is an exploded top perspective of a transmitter substrate assembly according to an embodiment of the present invention.

FIG. 3 is an exploded top perspective of the transmitter substrate assembly according to an embodiment of the present invention. The transmit chips 300 are connected to the input divider and output combiner described in FIG. 2 via caged via holes 112. The aluminum-graphite frame 105 supports the fuzz-bottom interconnects 111 that make vertical connections between various substrates possible. The fuzz-bottom interconnects 111 are similar to a plastic piece of wire, sometimes in the shape of a spring, that carries RF, digital, and DC signals between various substrates. The polarization control substrate 104 is attached to the aluminum graphite frame 105 using film-epoxy 110. The details of implementing an LTCC substrate 104 on an aluminum graphite frame 105 using film epoxy 104 and fuzz-bottom interconnects 111 are well within the skill of the ordinary artisan.

Figure 4:
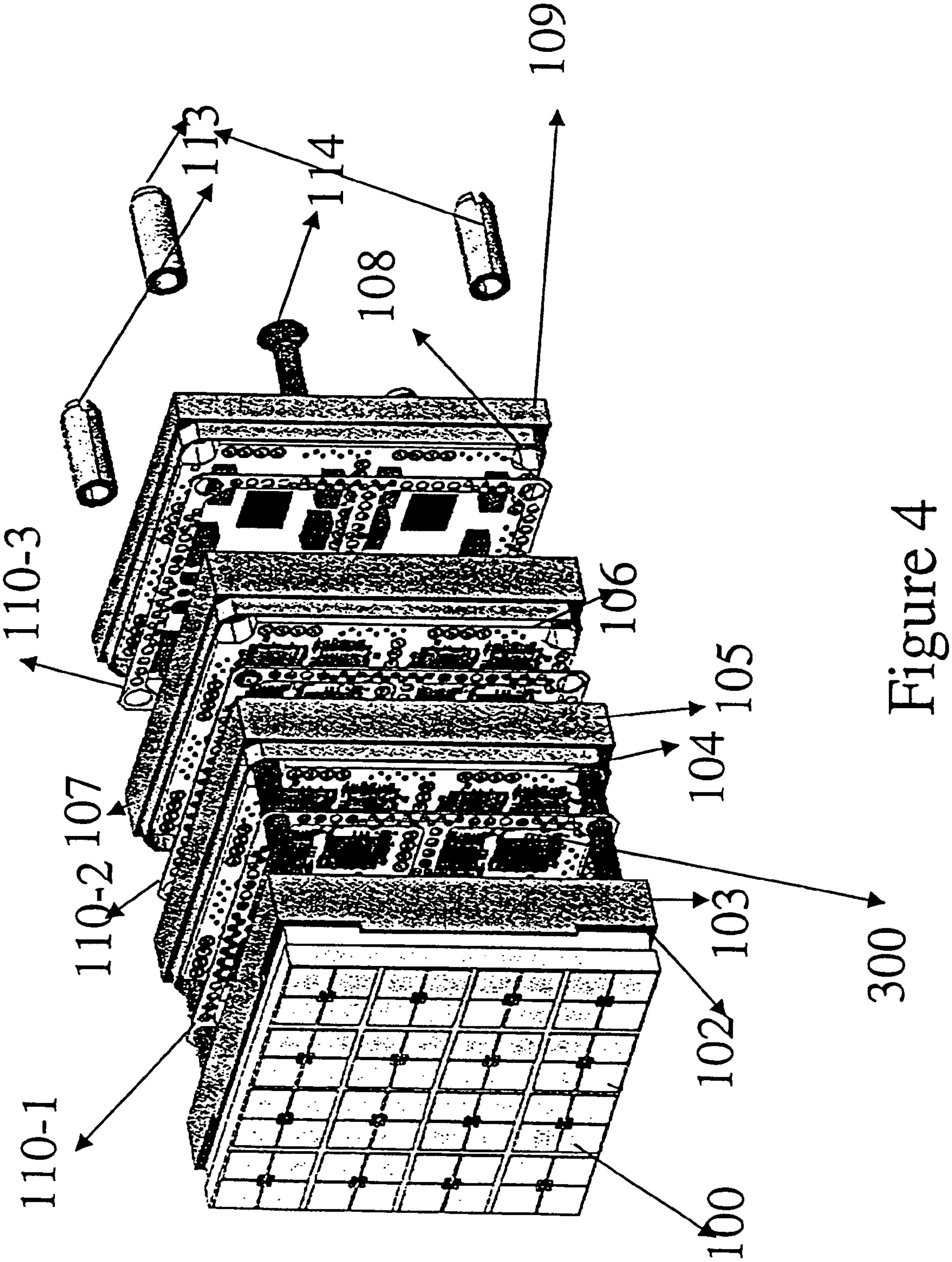
FIG. 4 is an exploded top perspective of a transmit phased array antenna according to an embodiment of the present invention.

FIG. 4 is a top perspective of a transmit array antenna according to an embodiment of the present invention. Sixteen square-patch radiators 100 are installed on the balun substrate 102. The balun substrate 102 is attached to an aluminum-graphite frame 103 using film epoxy. The frame 103 supports the fuzz-bottom interconnects to make vertical connection between various substrates possible. The first polarization control substrate 104 is installed on aluminum-graphite substrate 105 using film epoxy 110-1. Similarly, the second polarization control substrate 106 is installed on aluminum-graphite substrate 107 using film epoxy 110-2, while the interconnect substrate 108 is installed on aluminum-graphite substrate 109 using film epoxy 110-3. The aluminum frames 103, 105, 107 and 109 are bolted together using five screws 113 and 114.

The phased array antenna as described in FIG. 4 has a highly flexible design permitting ready modification for transmitting single or dual operating signals. Specifically, it is easy to remove the first polarization control substrate 104 by unscrewing the frames and removing the substrate 104, epoxy layer 110-1 and frame 105. When the first polarization control substrate 104 is removed from the antenna, the resulting stack operates with a single operating frequency.

As it should be clear to those of ordinary skill in the art, further embodiments of the present invention may be made without departing from its teachings and all such embodiments are considered to be within the spirit of the present invention. For example, although preferred embodiments of the present invention comprises four substrates built using LTCC technology, other material such as PC board can be used to build these substrates as well. Therefore, it is intended that all matter contained in above description or shown in the accompanying drawings shall be interpreted as exemplary and not limiting, and it is contemplated that the appended claims will cover any other such embodiments or modifications as fall within the true scope of the invention.

Figure 5:
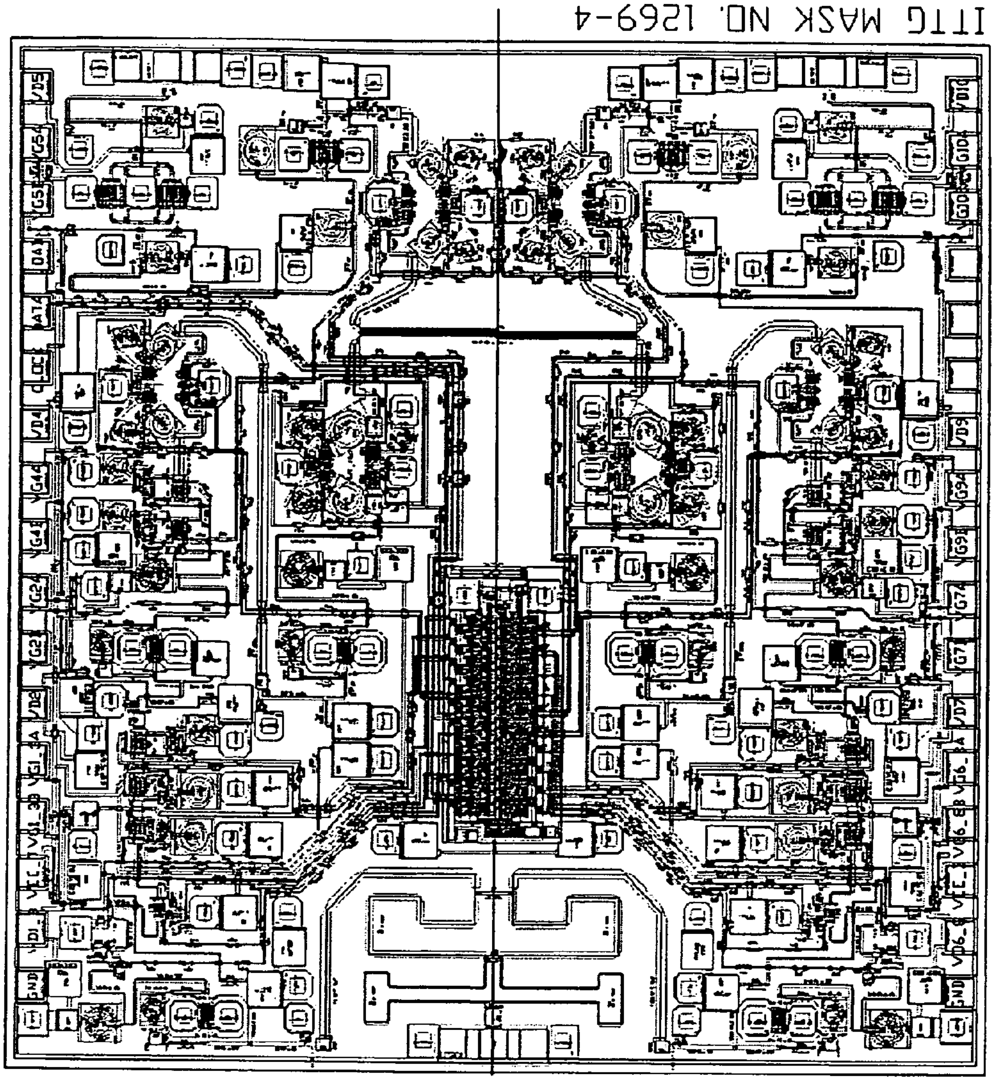
FIG. 5 is a schematic of the layout of the transmit chip according to an embodiment of the present invention.

FIG. 5 is a schematic of an exemplary layout of the transmit chip according to an embodiment of the present invention.

What is claimed is:

1. An antenna comprising:

a first substrate containing a plurality of transmitter chips, wherein each transmitter chip is comprised of a first series of phase shifters to control the scan angle and linear polarization of a first RF signal, a first 90° phase shifter to control the circular polarization of the first RF signal, and a first means for controlling the first series of phase shifters and the first 90° phase shifter;

a second substrate containing a plurality of transmitter chips, connected at the output of the first substrate, wherein each transmitter chip is comprised of a second series of phase shifters to control the scan angle and linear polarization of a second RF signal, a second 90° phase shifter to control the circular polarization of the second RF signal, and a second means for controlling the second series of phase shifters and the second 90° phase shifter; and a balun substrate connected at the output of the second substrate containing a number of baluns that divides an RF signal into two equal signals that are 180° out of phase with each other.

2. The antenna of claim 1 wherein the first substrate receives the first RF signal and the second substrate receives the second RF signal from an interconnect substrate.

3. The antenna of claim 1 wherein the antenna is capable of transmitting with a single operating signal.

4. The antenna of claim 1, wherein the balun substrate further comprises a number of radiator elements connected at the output of the baluns.

5. The antenna of claim 4, wherein each of the radiator elements are planar square patch radiator.

6. The antenna of claim 1, wherein each of the first, second and balun substrates is designed using MMIC technology.

7. The antenna of claim 1, wherein each of the first, second and balun substrates is built using LTCC technology.

8. The antenna of claim 1, wherein the first, second and balun substrates are interconnected using a Fuzz-bottom interconnect.

9. The antenna of claim 8, wherein the first, second and balun substrates are connected to the Fuzz-bottom interconnect using a film epoxy.

10. The antenna of claim 1, wherein each of the first, second and balun substrates is connected to a aluminum-graphite frame that provides support and heat sinking mechanism for the substrates.

* * * * *